UNITED STATES PATENT OFFICE.

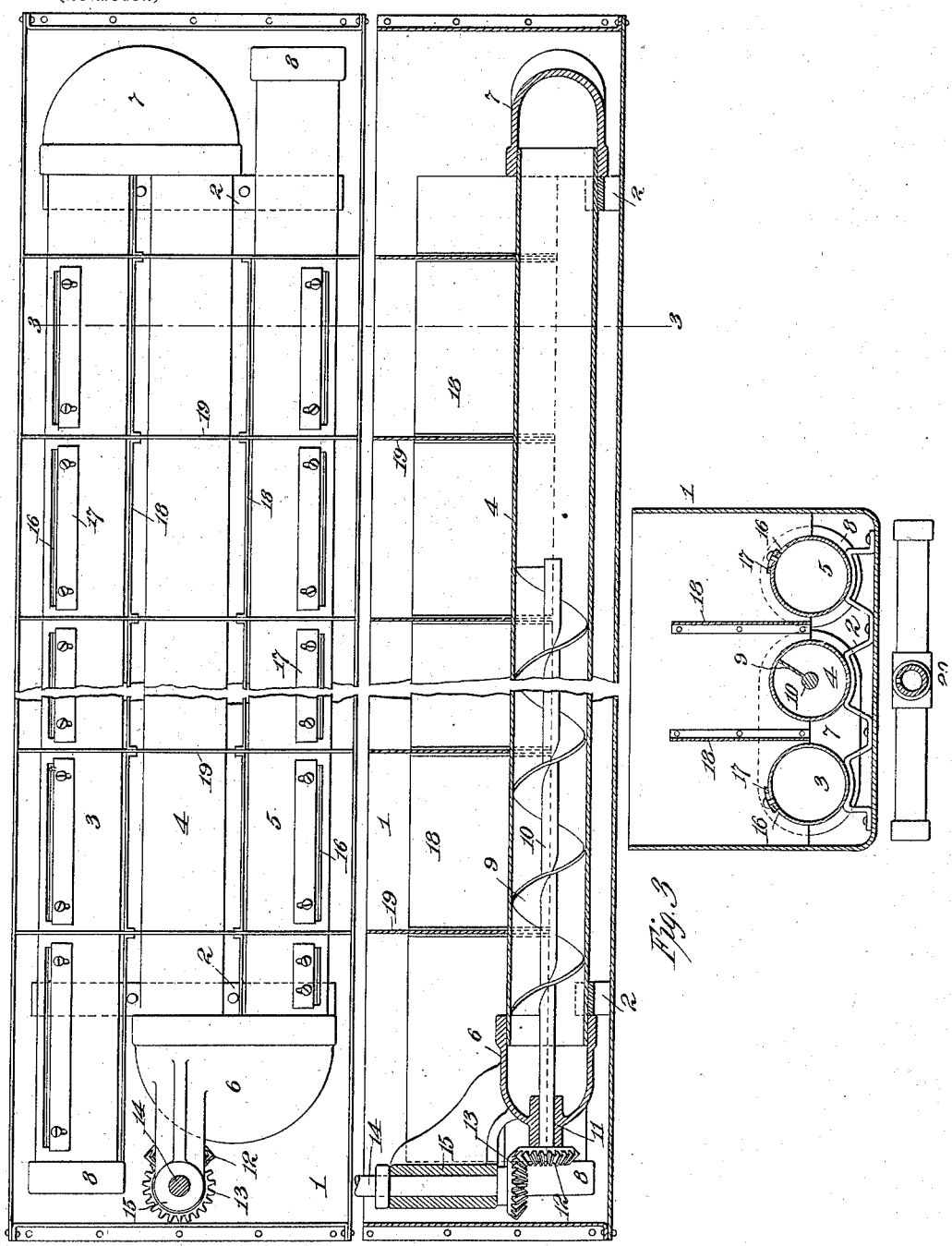

JONAS WALTER AYLSWORTH, OF EAST ORANGE, AND WALTER HENRY MILLER, OF ORANGE, NEW JERSEY, ASSIGNORS TO NATIONAL PHONOGRAPH COMPANY, OF ORANGE, NEW JERSEY, A CORPORATION OF NEW JERSEY.

DIPPING-TANK FOR PHONOGRAPHIC DUPLICATION PROCESSES.

SPECIFICATION forming part of Letters Patent No. 698,429, dated April 29, 1902.

Application filed May 2, 1901. Serial No. 58,421. (No model.)

*To all whom it may concern:*

Be it known that we, JONAS WALTER AYLSWORTH, residing at East Orange, and WALTER HENRY MILLER, residing at Orange, in the county of Essex and State of New Jersey, citizens of the United States, have invented a certain new and useful Improvement in Dipping-Tanks for Phonographic Duplication Processes, of which the following is a description.

In an application for Letters Patent of the United States filed July 31, 1900, numbered serially 25,391, we describe an improved process for duplicating phonographic records consisting generally in dipping a matrix or mold in a bath of molten coagulable material, whereby a layer of such material will accumulate on the bore of the matrix or mold, then in removing the matrix, finishing the interior of the duplicate, and shrinking the latter, which is finally removed by direct longitudinal movement. We find it desirable in the carrying out of the process, first, that the coagulable material should have an approximately constant temperature throughout in order that the deposit of the material on the matrix or mold will be practically homogeneous and of uniform thickness at all points, and, second, that the molten material should be maintained at a temperature as close to the congealing-point as possible in order that the deposit will take place expeditiously and with uniformity. If, however, a simple containing vessel were employed for holding the molten material and if the latter were maintained only slightly above the temperature at which it congeals the temperature of the material would not be uniform throughout, and its surface would become covered with a film due to the coagulation of the material by contact with the air. Moreover, assuming such a containing vessel to be employed, every time a matrix or mold was elevated out of the bath it would result in inevitable dripping of the material into the bath, which drippings in their passage through the air would form into solid clots or strings and float on the top of the molten material until melted again. The presence of any solid or stringy particles or film at the top of the bath is objectionable in the carrying out of the process.

Our present invention relates to a dipping-tank wherein these objections are overcome.

To this end the invention in its broad aspect comprises a vessel or receptacle for containing the molten material, means for heating the latter, and means for keeping the molten material in constant circulation at its upper strata at least.

More specifically considered the invention comprises a tank or vessel for containing the molten material, means for applying heat to the material, and means for circulating the molten material at its upper strata from one side to the other and at its lower strata either directly or indirectly in a reverse direction. Any suitable mechanism can be employed for effecting the proper circulation of the liquid, and in the drawings which form part of this specification we illustrate only one embodiment thereof.

In the drawings, Figure 1 is a plan view of the improved tank; Fig. 2, a longitudinal sectional view of the same, and Fig. 3 a section on the line 3 3 of Fig. 2. In these views corresponding parts are represented by the same numerals of reference.

1 represents a tank which may be generally rectangular in form, as shown, and be constructed of sheet metal. Supported in the tank on suitable brackets 2 from the bottom thereof are three pipes 3, 4, and 5, respectively, arranged side by side. The pipe 3 is connected to the pipe 4 at one end by a coupling 6, and the pipe 5 is connected to the pipe 4 at its other end by a coupling 7. Caps 8 8 are secured over the free ends of the pipes 3 and 5. Mounted in the pipe 4 and extending part way of the length thereof is a worm or screw 9, mounted on a shaft 10, which extends through a bearing 11 in the coupling 6. Mounted on the shaft 10 outside of the bearing 11 is a bevel-gear 12, with which a gear 13 engages, the latter being mounted on a drive-shaft 14, carried in a bearing 15, cast with the coupling 6, as shown. By applying power to the shaft 14 the worm will be driven, as will be understood. The pipes 3 and 5 are formed with slots 16 in their upper faces, and each slot is provided with an adjustable slide 17, by means of which the width of the slots may be regulated, as will be understood. Mounted in the tank 1 are longitudinal and cross partitions or diaphragms 18 and 19, respectively, which extend at their lower ends to a point about midway of the height of the circulating-pipes 3, 4, and 5, as shown. The molten material within the tank is maintained just above the top of the partitions or diaphragms, so that a circulation can take place above the same, as will be explained. The molten material is heated in any suitable way—as, for example, by ordinary gas-burners 20.

In operation the tank will be supplied with molten material, filling the same to a point immediately above the top of the partitions, as stated, and this level will be maintained in any suitable way. The material is maintained in a heated state, preferably at a point close to its congealing temperature. The worm 9 is now operated and causes material within the circulating-pipe 4 to be forced longitudinally through the same in the direction of the arrows. Material will be supplied to the intake side of the circulating-pipe 4 through the slots 16 in the pipe 3, and in consequence there will be a downward circulation of material into the pipe 3. The material forced out of the discharge end of the circulating-pipe 4 will flow into the circulating-pipe 5 and out through the slots 16 thereof, so as to pass upwardly toward the surface and flow crosswise of the mass above the longitudinal partitions. The matrices or molds are dipped into the mass within the rectangular pockets formed by each set of longitudinal and cross partitions, as will be understood. By maintaining a constant circulation of the molten material within the tank its temperature will be kept practically uniform throughout the mass, while by generating a circulation in the upper strata of the material any solid clots or strings thereof which may fall back into the tank as drippings from the molds will be immediately carried to one side, having ample opportunity to be remelted before being again drawn through the circulating-pipes.

Having now described our invention, what we claim as new, and desire to secure by Letters Patent, is as follows:

1. An improved tank for a phonographic duplication process, comprising a receptacle or vessel for containing a molten coagulable material, a downflow-passage in said vessel, an upflow-passage therein, said passages being connected at the top and bottom, whereby the molten material may flow down the downflow-passage to and up through the upflow-passage and across to the downflow-passage, so that a cross circulation of the material in its upper strata and a reverse circulation of the material in its lower strata will be secured, means for effecting the flow of such material, and means for heating the material, substantially as set forth.

2. An improved dipping-tank for a phonographic duplication process, comprising a vessel or receptacle for containing a molten coagulable material, two vertically-arranged partitions in said vessel forming a downflow-passage, an upflow-passage, and a centrally-arranged dipping-space, the downflow-passage being connected with the upflow-passage substantially as set forth, means for maintaining a circulation of material in the vessel, and means for heating the material.

3. An improved dipping-tank for a phonograph duplication process, comprising a vessel or receptacle for containing the molten coagulable material, two perforated circulating-pipes in the vessel, means for drawing material downwardly into one of said pipes and for forcing the material upwardly from the other of said pipes, and a connection between said pipes, substantially as set forth.

4. An improved dipping-tank for a phonograph duplication process, comprising a vessel or receptacle for containing the molten coagulable material, two perforated circulating-pipes in the vessel, means for drawing material downwardly into one of said pipes and for forcing the material upwardly from the other of said pipes, a connecting circulating-pipe between the two, and means therein for maintaining circulation, substantially as set forth.

5. An improved dipping-tank for a phonograph duplication process, comprising a vessel or receptacle for containing the molten coagulable material, two perforated circulating-pipes in the vessel, means for drawing material downwardly into one of said pipes and for forcing the material upwardly from the other of said pipes, a connecting circulating-pipe between the two, and a worm therein for maintaining circulation, substantially as set forth.

6. An improved dipping-tank for a phonograph duplication process, comprising a vessel or receptacle, means for heating the molten material, means for maintaining the molten material in circulation, and cross partitions or diaphragms within the tank for guiding the cross circulation of the material, substantially as set forth.

7. An improved dipping-tank for a phonograph duplication process, comprising a vessel or receptacle, means for heating the molten material, means for maintaining the molten material in circulation, cross partitions or diaphragms within the tank for guiding the cross circulation of the material, and longitudinal partitions in said vessel or receptacle, substantially as set forth.

8. An improved dipping-tank for a phonograph duplication process, comprising a vessel or receptacle, three connected circulating-pipes therein, the outside pipes being perforated, and means in the middle pipe for maintaining a circulation through the same, substantially as set forth.

9. An improved dipping-tank for a phonograph duplication process, comprising a vessel or receptacle, three connected circulating-pipes therein, the outside pipes being perforated, and a worm in the middle pipe for maintaining a circulation, substantially as set forth.

10. An improved dipping-tank for a phonograph duplication process, comprising a vessel or receptacle, three connected circulating-pipes therein, the outside pipes being perforated, means in the middle pipe for maintaining a circulation through the same, and means for adjusting the width of the slots in said pipes, substantially as set forth.

This specification signed and witnessed this 2d day of April, 1901.

JONAS WALTER AYLSWORTH.
WALTER HENRY MILLER.

Witnesses to signature of Jonas Walter Aylsworth:
J. F. RANDOLPH,
J. A. BOEHME.

Witnesses to signature of Walter Henry Miller:
FREDERICK B. OTT,
E. A. JAQUES.